United States Patent [19]

Kratt et al.

[11] 3,987,277
[45] Oct. 19, 1976

[54] SYSTEM FOR DIGITALLY COLLECTING AND STORING DATA

[75] Inventors: Kurt Kratt; Wolfgang Schweikert, both of Aldingen, Germany

[73] Assignee: J. Hengstler K.G., Aldingen, Germany

[22] Filed: July 11, 1974

[21] Appl. No.: 487,569

[30] Foreign Application Priority Data

July 18, 1973 Germany............................ 2336441

[52] U.S. Cl. ........................ 235/61.6 R; 235/92 CT; 235/61.11 C
[51] Int. Cl.² ..................... G06K 7/04; G06K 15/18; G06F 7/38
[58] Field of Search .................. 235/61.6 R, 61.6 C, 235/92 C, 92 CT, 61.11 C, 92 PE, 61.1

[56] References Cited
UNITED STATES PATENTS

| | | | |
|---|---|---|---|
| 3,238,359 | 3/1966 | Einem | 235/92 C |
| 3,249,742 | 5/1966 | Buchsbaum | 235/92 C |
| 3,278,725 | 10/1966 | Gunst | 235/92 C |
| 3,376,569 | 4/1968 | Watkins | 235/92 C |
| 3,436,530 | 4/1969 | Faude | 235/92 CT |
| 3,551,652 | 12/1970 | Faude | 235/92 CT |
| 3,644,711 | 2/1972 | Haller | 235/61.1 |
| 3,779,357 | 12/1973 | Haller | 235/92 CT |
| 3,786,960 | 1/1974 | Young | 235/92 CT |
| 3,855,454 | 12/1974 | Eisen | 235/92 CT |

Primary Examiner—Daryl W. Cook
Assistant Examiner—Robert M. Kilgore

[57] ABSTRACT

The system serves to digitally collect and store data in readable form and comprises counters for storing data and a main unit, which comprises adapters removably holding respective ones of said counters in counting positions and control means for controlling said counters in said counting positions.

9 Claims, 12 Drawing Figures

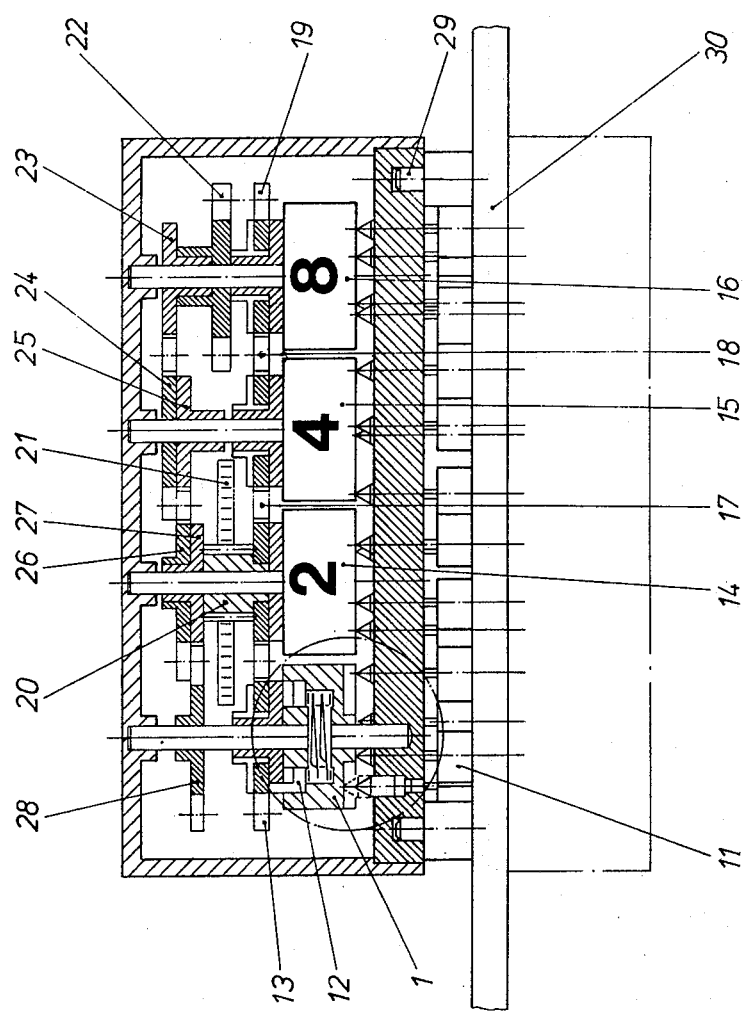
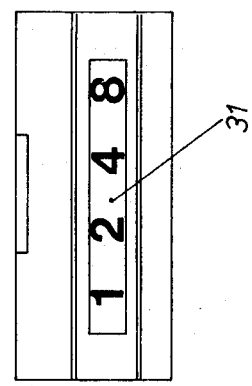

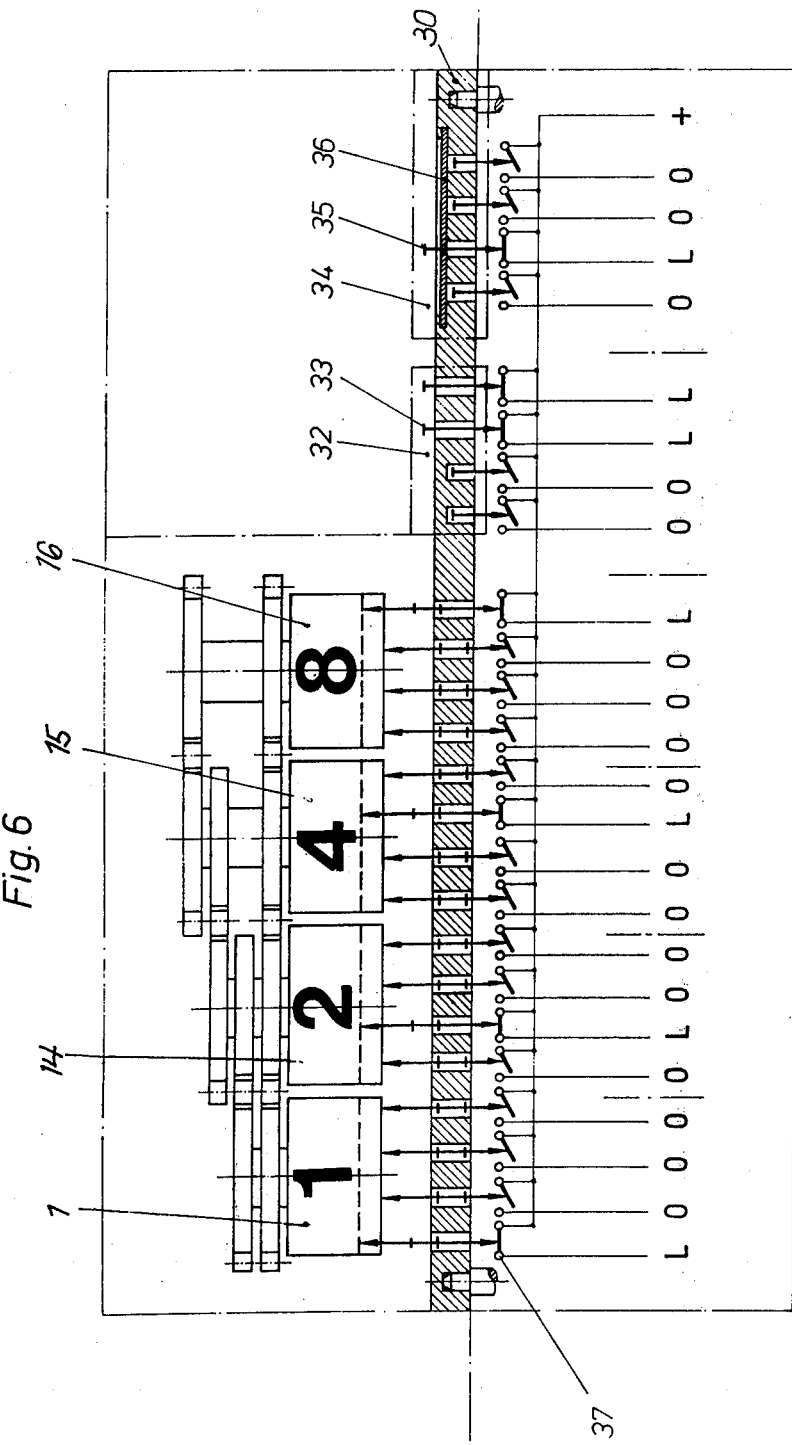

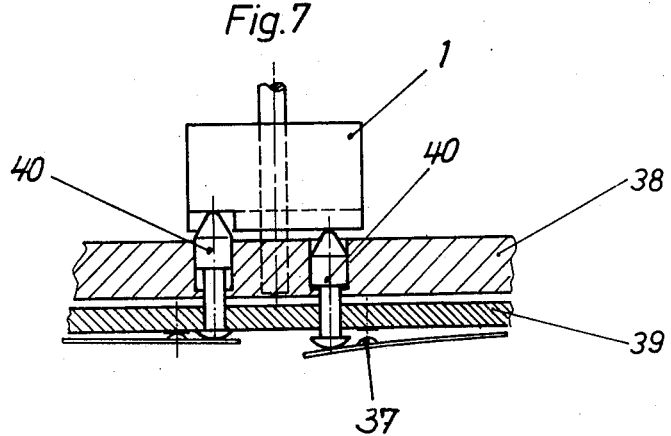
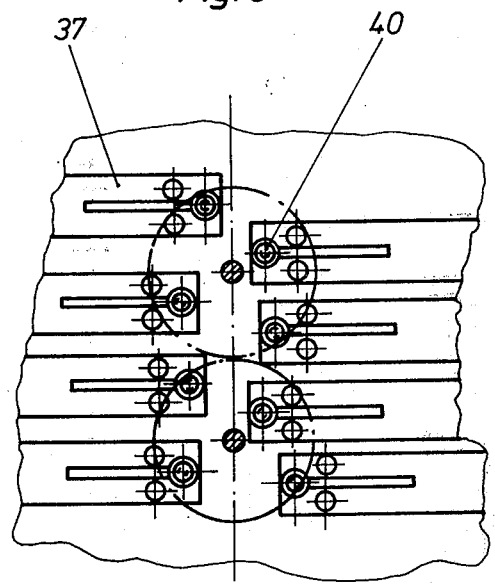

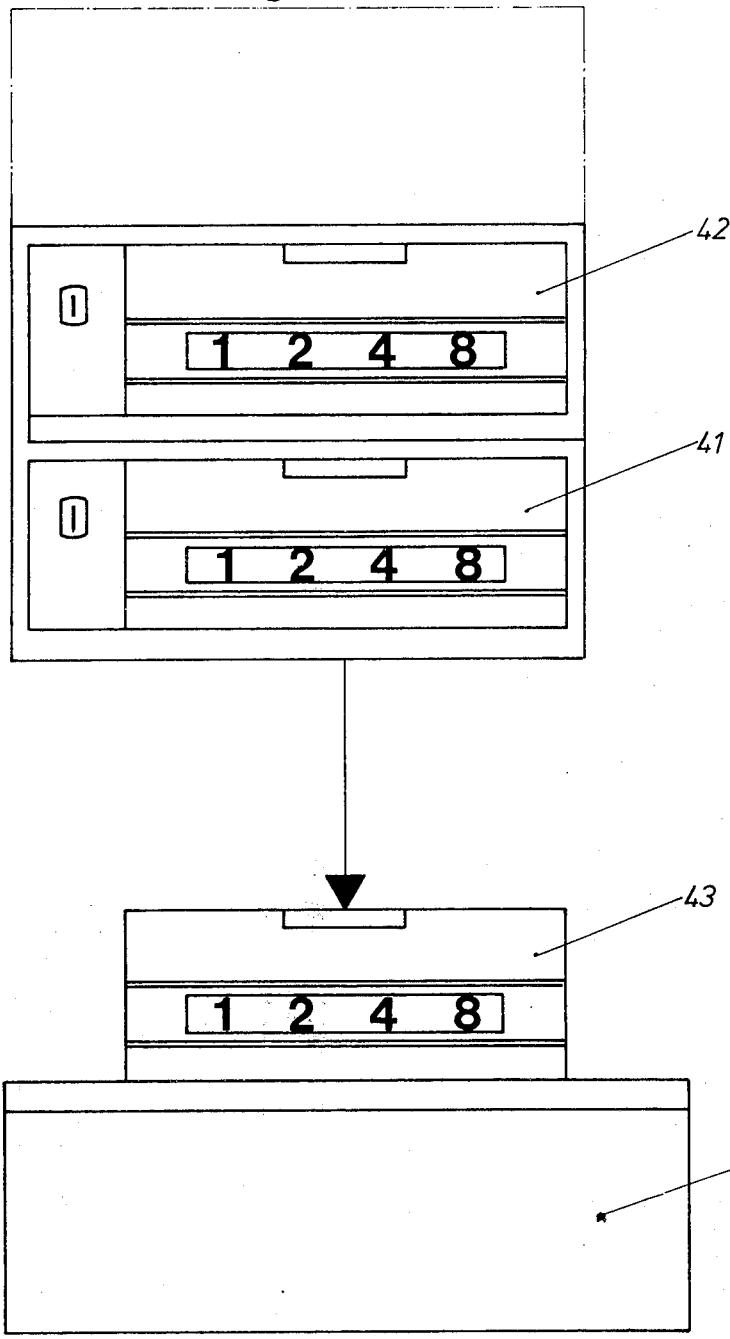

SYSTEM FOR DIGITALLY COLLECTING AND STORING DATA

This invention relates to a system for digitally collecting and storing data and for reading the stored data.

Data have previously been collected at data-originating stations, e.g., the work place or machine, by means of associated counters, from which the data must be read, written down, and then recorded on data carriers unless expensive links for a transmission of data to central stations are installed. The reading of individual data is laborious and time-consuming and may involve errors in reading and transmitting the data. The previously known transmission to a central station is expensive, as has been mentioned, and is not variable because it cannot be readily adapted to the locations where the data originate and to the requirements involved in such origination.

It is an object of the invention to provide a system for digitally collecting and storing data in conjunction with several locations where data originate, such as work places or machines, for a processing of such data or for a recording of data in a form suitable for electronic data processing.

For this purpose, it is a feature of the invention that data storage counters are plugged into respective adapters and are thus connected to the respective device or machine so as to be capable of collecting the data. The data are collected by the counters, and the contents of the storage counter can be displayed at any time. For collection of the data, the storage counter is located in the adapter at the collecting station. In multishift operations, the data may be separately collected for each shift in that separate storage counters are used for each shift. All data which can be digitally represented may be collected, depending on the design of the adapter and its drive means. The number of digits in the storage device may be restricted if scalers are used, which are properly provided in the adapter and in the storage counter.

To enable a transfer to other data carriers of the data stored in the storage counter, the latter can be read mechanically. For this purpose the digit wheels of the storage counter are mounted on parallel axes and provided on an end face with code elevations and recesses. These digit wheels are provided on their periphery with digits for displaying the stored count in the display window on the front side. The coded count is mechanically detected by detector pins, which are associated with each digit wheel and serve for a connection to a reader. When it is desired to read the storage counter, the latter is removed from the data-collecting station and inserted into the reader. It is not necessary, as a rule, to read the content of the storage counter during the collection of the data. While one storage counter is being read, another storage counter may be used to collect the data.

Further details of the system according to the invention for digitally collecting and storing data by means of data storage devices and for reading the stored data will be described hereinafter with reference to illustrative embodiments shown on the drawings, in which FIGS. 1 to 3 are sectional views showing reading pins cooperating with a coded digit wheel.

FIGS. 4 and 5 represent together a sectional view of a four-digit data storage counter with the reading side shown in an elevation.

FIG. 6 is a diagrammatic sectional view according to FIG. 4 with an additional identification code for the storage counter and job.

FIGS. 7 and 8 are, respectively, an elevation and a sectional view showing a reading plate designed for mechanical reading.

FIGS. 9 and 10 are diagrammatic views showing the association of the storage counter and the adapter and the association of the storage counter and the reader for a reading operation.

Figures 1, 2, 3:
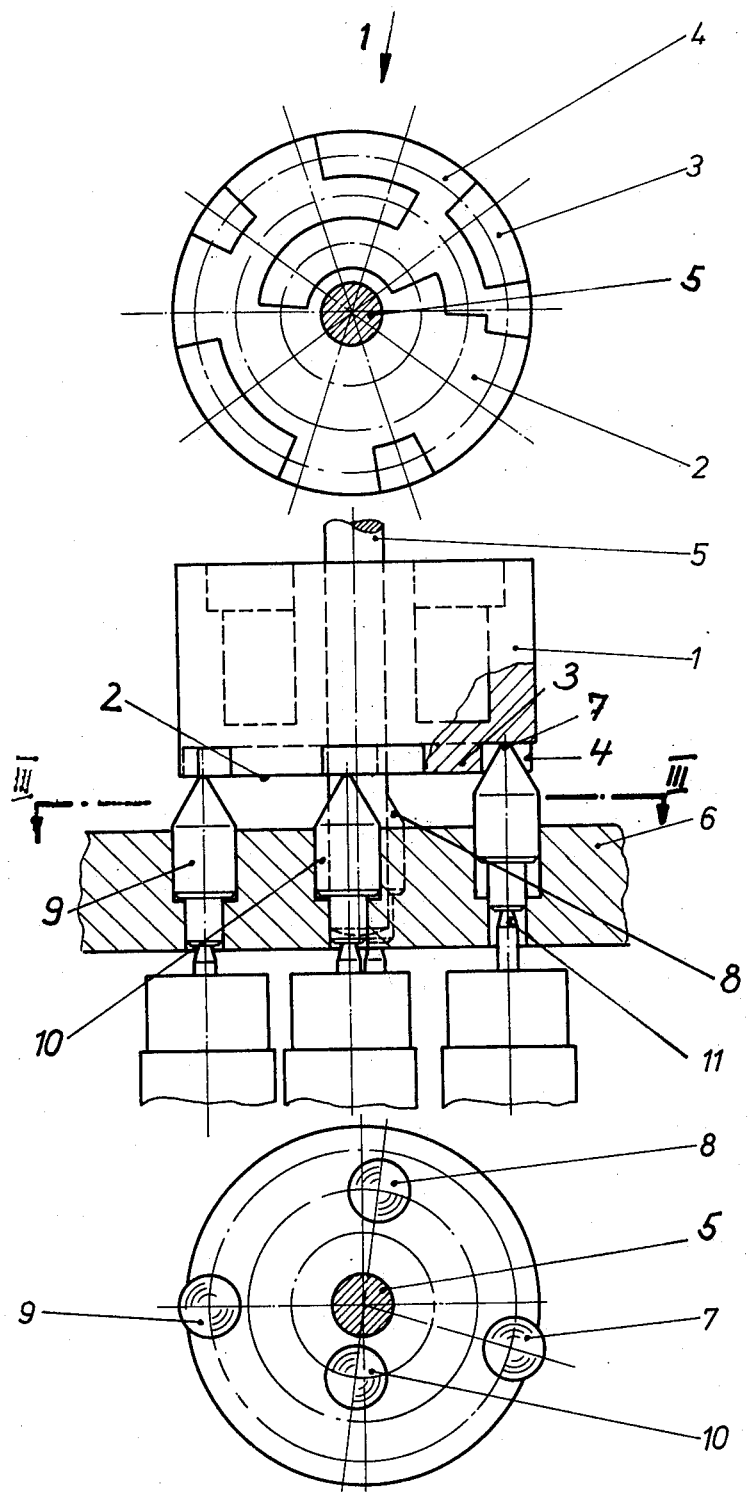

FIGS. 1 to 3 show a coded digit wheel 1, which on its face 2 is provided with code elevations 3 and recesses 4. The coded digit wheel 1 is firmly mounted on the shaft 5 and is rotatably mounted by said shaft in the frame 6. Means for mechanically detecting the code elements on the end face 2 of the coded digit wheel 1 comprise pins 7, 8, 9, 10, which are mounted in the frame 6 and have conical ends facing the code elements so that the pins can yield as the coded digit wheel 1 rotates. These pins 7, 8, 9, 10 are arranged on different concentric circles and in different angular positions around the axis of the shaft 5 and act as interposed elements, which serve to detect the code elements and provide for an output from the frame. They also close the openings in the frame 6. Detector elements 11 are also indicated, which are parts of the reader and serve here only to indicate the reading function.

FIG. 4 shows the arrangement of the coded digit wheel 1 in a four-digit data storage counter. In addition to the above-described assembly which comprises the coded digit wheel 1, the storage counter comprises means for resetting the digit wheel and for effecting a carry therefrom in a manner which is known in connection with counters. A ratchet mechanism 12 is provided between the coded digit wheel 1 and the spur gear 13. Similar ratchet mechanisms are associated with the additional coded digit wheels 14, 15, 16. These ratchet mechanisms serve to reset the digit wheels by means of spur gears 17, 18, 19, which are in mesh with each other. The resetting means are driven by a pinion 20 and a spur gear 21, which is connected to means, not shown, which serve for a manual or automatic operation of the resetting means.

The digital data storage counter is driven by the drive wheel 22, which drives the coded digit wheel 16 associated with the least significant digit. A decimal carry is effected by a one-tooth gear 23 and a spur gear 24 to the coded digit wheel 15, and further by additional one-tooth gears 25 and 27 and spur gears 26 and 28 to the coded digit wheels 14 and 1. Centering holes 29 are provided to ensure that the counter will always be in the same position for reading. The reader 30 is represented as a block provided with a multiplicity of detector elements 11 for detecting the mechanical code elements on the coded digit wheels 1, 14, 15, 16. FIG. 5 shows this digital data storage counter as viewed from the reading side, with a display area 31 for displaying the count of the storage counter.

FIG. 6 shows diagrammatically the functional relation between the data storage counter of FIG. 4 and the reader. In this representation the storage counter of FIG. 4 has been extended by a code area 32, from which the number of the data storage counter can be detected by code detector pins 33, and a code area 34, which is provided with a punched tape 36, from which the job number can be detected by code detector pins 35.

The diagrammatically shown reader 30 comprises a multiplicity of contacts 37, each of which is either open or closed, depending on the values stored in the data storage device and the codes in the code areas 32 and 34. When a reading current flows through the contacts 37, correspondingly coded signals appear in known manner at the outputs L or O and may be used to control succeeding indicating means.

In the example shown in FIG. 6, the sequence of the signals L, O represents in the BCD code the count 1248 stored in the data storage counter.

FIGS. 7 and 8 show an illustrative embodiment of a reading plate 38. The contacts 37 cooperate directly with a printed circuit board and are operated by code detector pins 40.

FIG. 9 shows how the data storage counter is associated with the adapter. A plurality of data storage counters 41 and 42 are shown. A further data storage counter 43 has been removed for reading.

FIG. 10 shows the relation between the data storage counter 43 and the reader 30 so that the display area remains visible during the reading operation.

Figure 11:
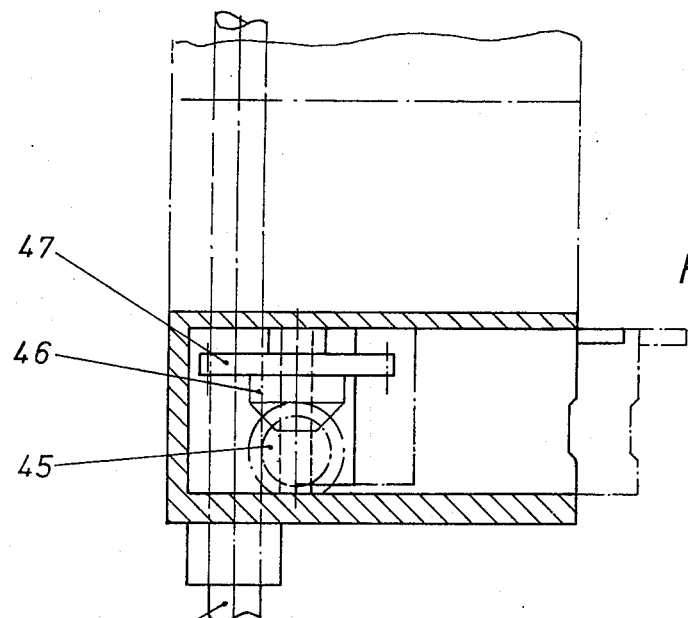
FIG. 11 is a diagrammatic view showing the arrangement of the drive means in the adapter.
Figure 12:
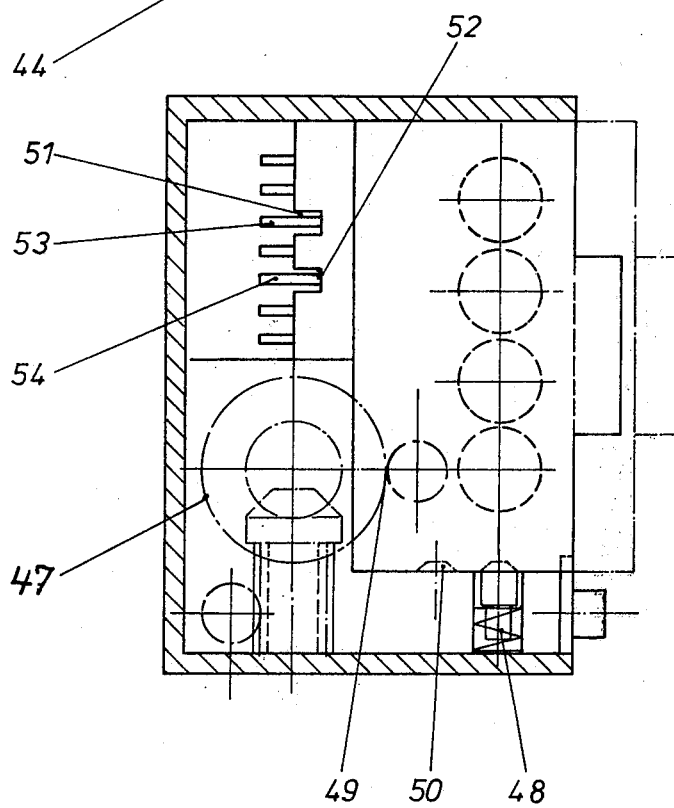
FIG. 12 shows diagrammatically the adapter provided with the allocation code detector and detent means.

The drive means required to drive the data storage counters are shown by way of example in FIGS. 11 and 12. In accordance therewith, the data storage counter is driven by means of a worm 44, a worm wheel 45, a bevel gearing 46 and a spur gear 47. Detent means 48 serve to lock the data storage counter in a position in which the gear 47 in the adapter and the gear 22 in the data storage counter of FIG. 4 mesh at 49. The second detent groove 50 serves to lock the data storage counter in the adapter in an inoperative position. An allocation code, known per se, is provided in cases in which each data storage counter must be allocated with a specific adapter. For this purpose, the data storage counter is provided with marginal slots 51 and 52, and code detector plates 53 and 54 are associated with the adapter. These means 51, 52, 53, 54 enable the establishment of an operative connection only if the codes agree.

What is claimed is:

1. A system for digitally collecting and storing data in readable form, comprising:
   at least one counter;
   at least one axially rotatable digit wheel in each counter;
   digit indicia disposed on the surface of each digit wheel;
   a plurality of count-indicating code elements disposed on respective concentric circles and at respective angular positions on the end face of each digit wheel; and
   a plurality of axially slidable code reading pins disposed adjacent the end face of each digit wheel in corresponding concentric circles and angular positions as, and for contact engagement with, said code elements.

2. A system as claimed in claim 1, comprising:
   a data collecting station;
   an adapter in said data collecting station for releasably engaging at least one counter in counting position; and
   decimal interconnecting gearing means in said adapter actuated by the subject to be counted and for driving the digit wheel of an engaged counter.

3. A system as set forth in claim 1, wherein said count-indicating code elements comprise combinations of elevations and recesses on the end face of said digit wheel.

4. A system as claimed in claim 1, comprising:
   a reader;
   means on said reader for receiving and engaging a counter; and
   a plurality of detector elements on said reader disposed to be actuated by respective count-indicating code elements of an engaged counter.

5. A system as claimed in claim 4, comprising a plurality of electrical contacts disposed in said reader for actuation by axial movement of respective detector elements.

6. A system as claimed in claim 4, comprising:
   an electrical circuit board in said reader; and
   a plurality of electrical switches disposed on said circuit board for actuation by respective counter detector elements.

7. A system as claimed in claim 1, comprising:
   a tape holder associated with each counter for receiving a coded tape representing an identification of the subject to be counted; and
   means in said reader for reading the code on the tape.

8. A system as claimed in claim 1, wherein each counter comprises means for cyclical rotation of said digit wheel.

9. A system as claimed in claim 1, wherein each counter comprises resetting means from a counted position to a start position.

* * * * *